INVENTOR.
HUBERT U. BUCHNER,
BY
Berman, Davidson + Berman
ATTORNEYS.

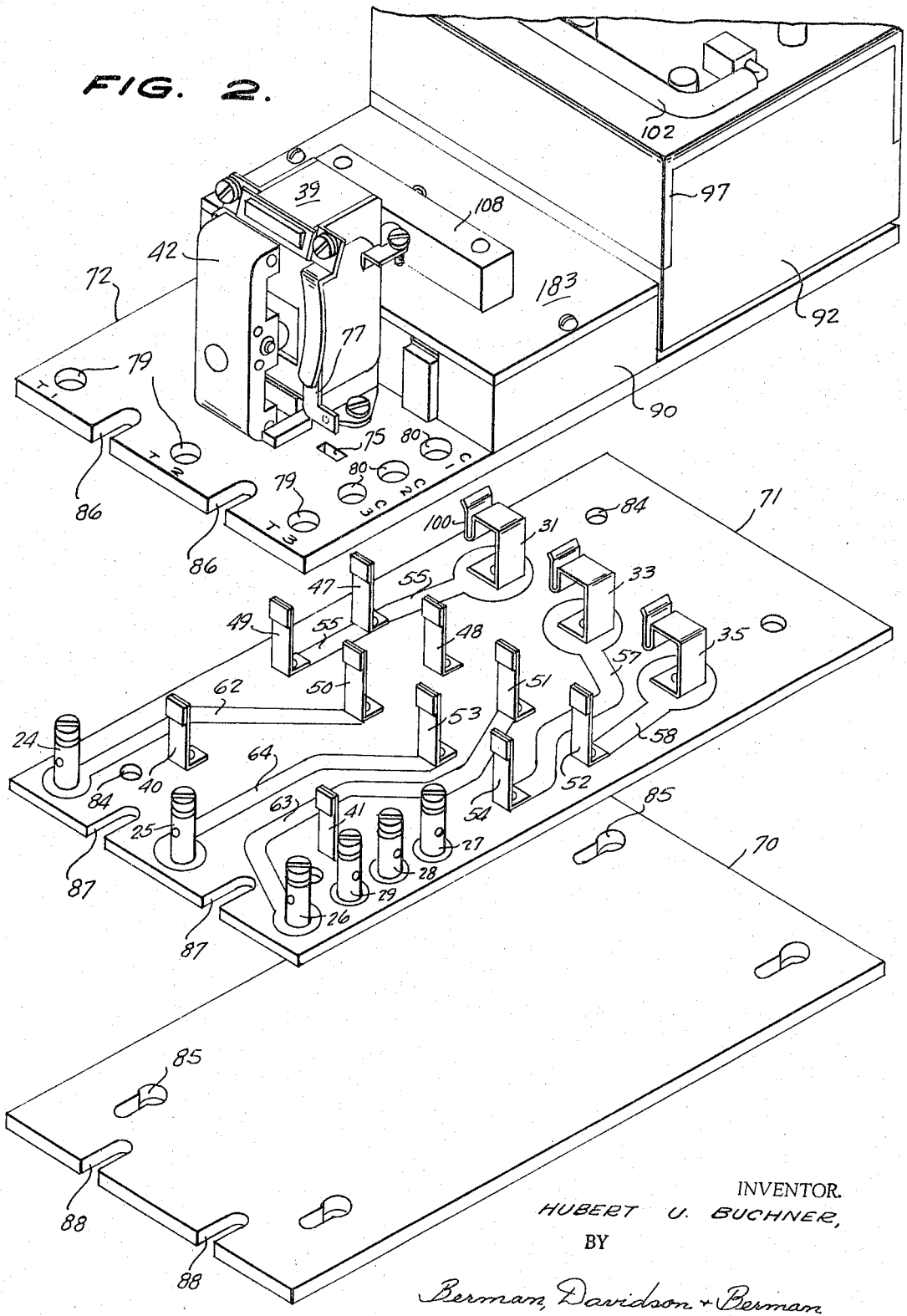

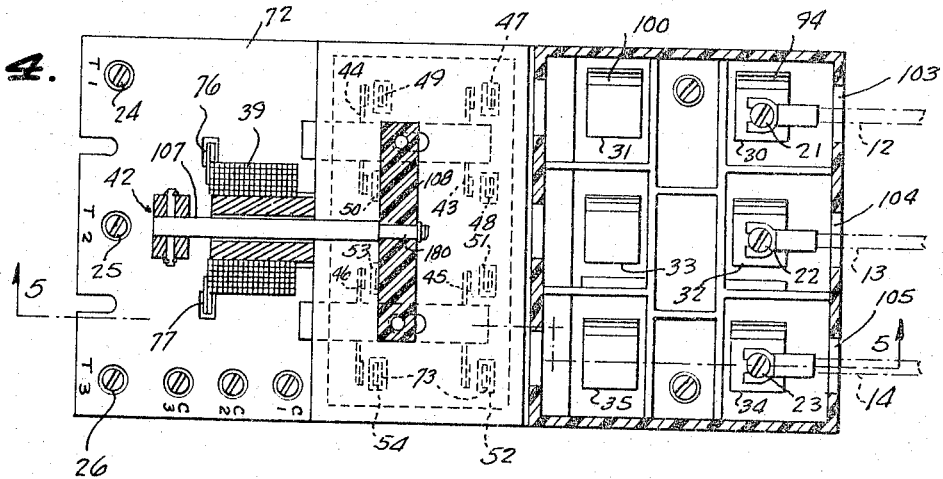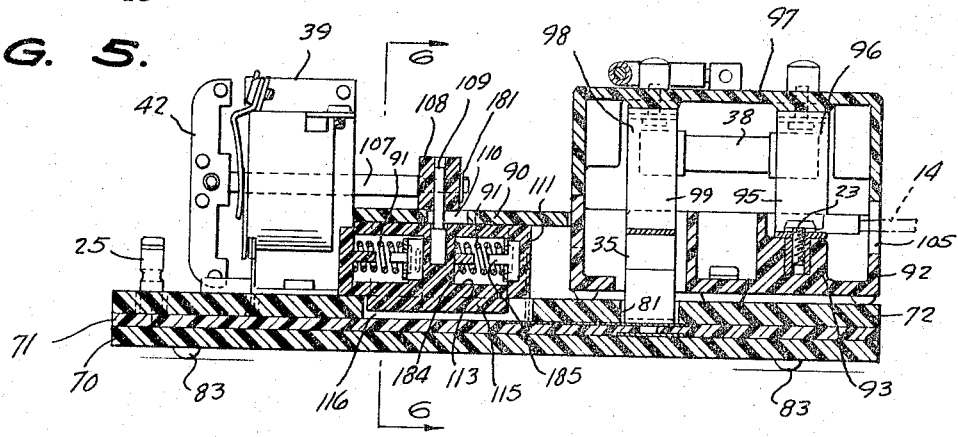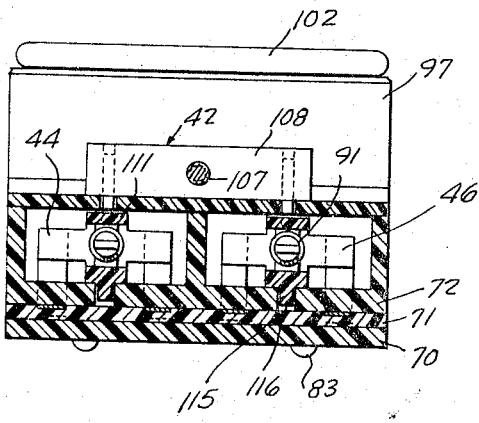

INVENTOR.
HUBERT U. BUCHNER,
BY
Berman, Davidson + Berman
ATTORNEYS.

United States Patent Office 3,327,168
Patented June 20, 1967

3,327,168
DUAL-ELEMENT MOTOR CONTROLLER
Hubert U. Buchner, 506 Elm St.,
Crossett, Ark. 71635
Filed Oct. 6, 1964, Ser. No. 401,772
4 Claims. (Cl. 317—13)

This invention relates to motor starting devices, and more particularly to an electric motor controller adapted for use with three-phase motors and having overload protective means incorporated therein.

A main object of the invention is to provide a novel and improved motor controller especially useful with three-phase motors and being provided with improved overload protective means, the controller being simple in construction, being easy to install and being reliable in operation.

A further object of the invention is to provide an improved electric motor starting device which involves relatively inexpensive components, which is compact in size, which includes readily replaceable overload protective devices, and which provides two types of overload protection, namely, protection against sustained overloads as well as sudden short circuits, of the type caused by ground faults, motor short circuits, or the like.

A still further object of the invention is to provide an improved motor controller especially suited for use in three-phase circuits and in conjunction with three-phase motors, the controller device being easy to operate, involving a minimum number of moving parts, being easy to assemble, and being arranged so that its overload-responsive elements can be easily and rapidly removed for inspection.

A still further object of the invention is to provide an improved three-phase motor controller which includes dual-function protective elements of a type which are readily available so that they can be easily replaced, the controller including a removable supporting housing for the overload-protecting elements and being arranged so that when the housing is reversed the remainder of the controller is disconnected and isolated from the power supply lines.

A still further object of the invention is to provide an improved three-phase motor controller which employs dual-function overload protective elements which can be selected in accordance with the size and type of motor with which the controller is employed, so that the controller can be used with a wide range of three-phase motors having widely different characteristics.

A still further object of the invention is to provide an improved motor controller, especially useful with three-phase motors, which is provided with dual-element overload protective devices which are operative to protect the system against either sudden or sustained overloads even if the main contacts of the controller are held closed, for example, if the contacts become welded together or are jammed in closed position, whereby to provide a higher degree of protection than has been heretofore obtainable with previously known motor controller devices intended to perform a similar function.

Further objects and advantages of the invention will become apparent from the following description and claims, and from the accompanying drawings, wherein:

FIGURE 2 is a perspective view showing the main structural components of the motor controlling device of FIGURE 1 in separated positions.

FIGURE 4 is a horizontal cross sectional view taken substantially on the line 4—4 of FIGURE 1.

FIGURE is a longitudinal vertical cross sectional view taken substantially on the line 5—5 of FIGURE 4.

FIGURE 6 is a transverse vertical cross sectional view taken substantially on the line 6—6 of FIGURE 5.

Figures 1, 3:
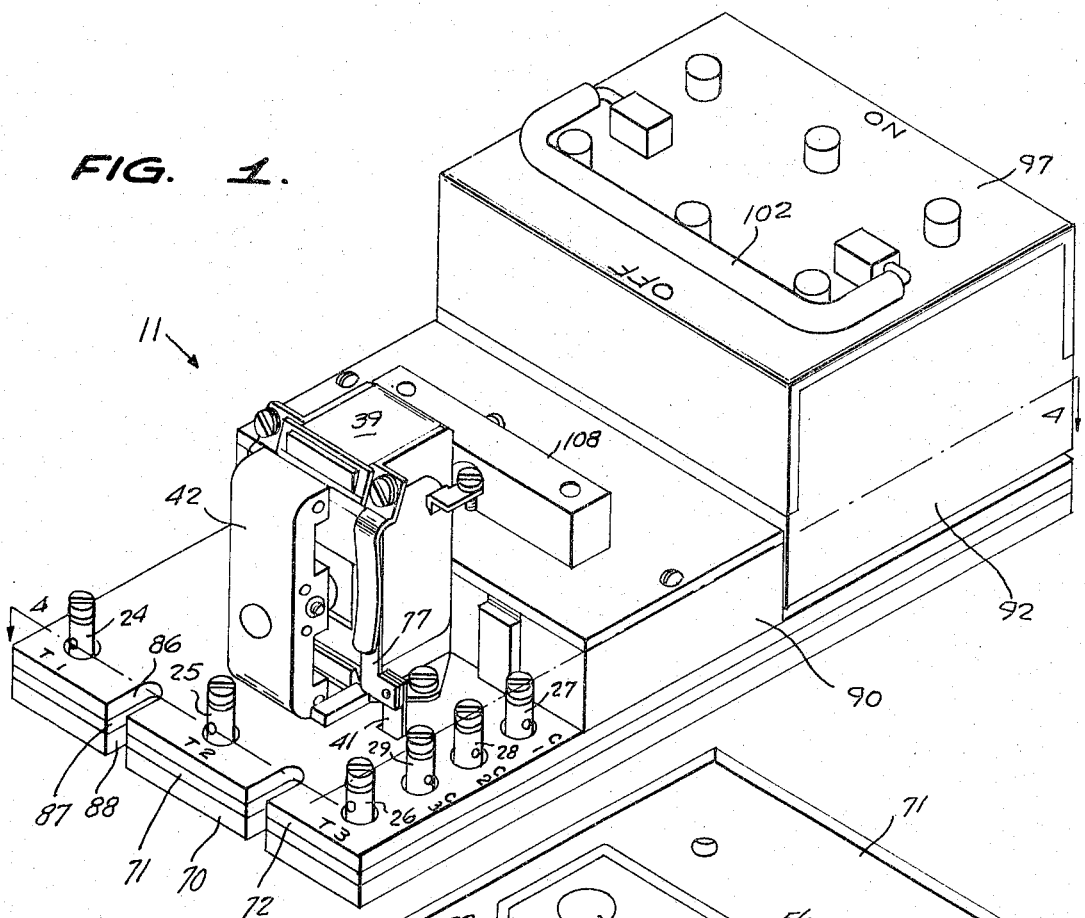
FIGURE 1 is a perspective view of an improved motor controlling device constructed in accordance with the present invention.
FIGURE 3 is a bottom perspective view of the intermediate circuit-forming plate member employed in the motor controller illustrated in FIGURES 1 and 2.
Figure 7:
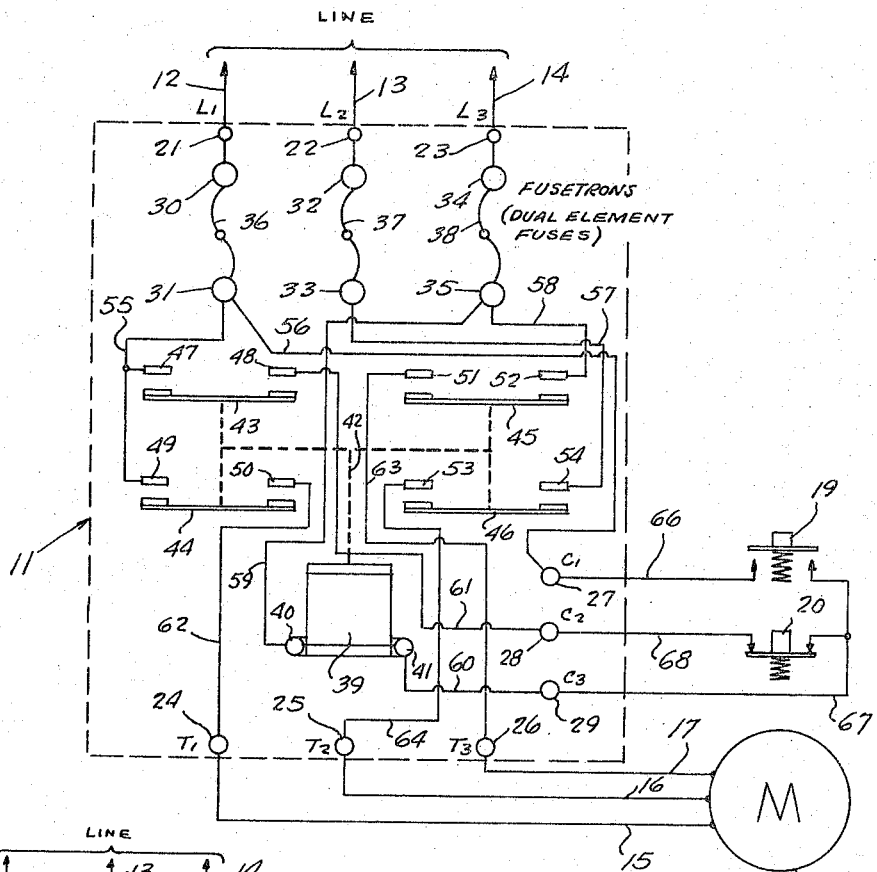

FIGURE 7 is a schematic wiring diagram showing the circuit connections of the motor controller of FIGURES 1 to 6, including a three-phase motor and control switches connected thereto, for controlling the energization and deenergization of the motor by means of the controller device.

Figure 8:
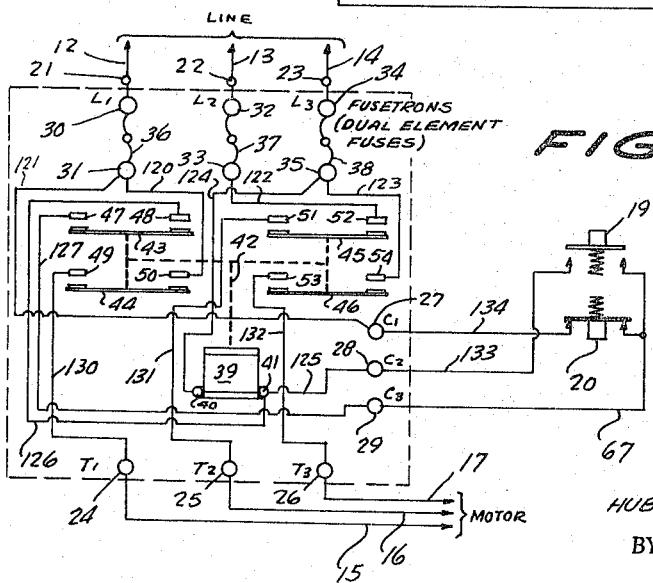

FIGURE 8 is a wiring diagram showing an alternative circuit arrangement in an improved motor controller constructed in accordance with the present invention.

Referring to the drawings, and more particularly to FIGURE 7, 11 generally designates one form of motor controlling device constructed in accordance with the present invention. The schematic wiring diagram of FIGURE 7 shows the internal electrical connections of the motor controlling device 11 and illustrates the manner in which it is connected between a set of supply conductors 12, 13 and 14 of a conventional three-phase alternating current supply system and the input conductors 15, 16 and 17 of a three-phase alternating current motor 18. The diagram also illustrates the connections associated with a motor starting switch 19 and a motor stopping switch 20.

The controller 11 is provided with the line input terminals 21, 22 and 23 to which the power supply wires 12, 13 and 14 are respectively connected. The controller 11 is further provided with the output terminals 24, 25 and 26 to which the motor input wires 15, 16 and 17 are respectively connected. The controller 11 is also provided with control switch terminals 27, 28 and 29 to which the manually operated control switches 19 and 20 are connected in a manner presently to be described.

The controller device 11 is provided with respective pairs of aligned, spaced fuse clip terminals 30 and 31, 32 and 33, and 34 and 35 to which are connected respective dual element fuses 36, 37 and 38, similar to the type known as "Fusetrons," manufactured by Bussmann Mfg. Company, St. Louis, Mo., said dual element fuses being adapted to provide two types of overload protection, namely, sustained overloads of a predetermined magnitude and duration or dangerous short circuit overloads such as those caused by direct short circuits. In other words, momentary heavy overloads will not cause these fuses to blow but a heavy overload such as that caused by direct short circuit will cause these fuses to open. Thus each of the fuses may comprise two fuse elements connected in series, one including melt-out bridge portions which blow out only when dangerous short circuit currents pass therethrough, the other fuse element comprising a special alloy designed to pass momentary overloads which liquefies as a result of a predetermined duration of sustained overload without passing through a slow melting stage. The construction and design of the dual element fuses 36, 37 and 38 is conventional and well known.

The controller device 11 is provided with an operating solenoid 39 whose winding has the contact terminals 76 and 77. Secured to the movable plunger of the solenoid, schematically shown at 42, are four armature elements 43, 44, 45 and 46 of conductive material but insulated from each other. When the solenoid 39 is energized, the armature 43 is adapted to conductively connect a pair of stationary contacts 47 and 48, the conductive armature 44 is adapted to bridgingly connect a pair of stationary contacts 49 and 50, the armature 45 is adapted to bridgingly connect a pair of stationary contacts 51 and 52, and the armature 46 is adapted to bridgingly connect a pair of stationary contacts 53 and 54. The plunger 42 is normally retracted by gravity so that the armature elements 43, 44, 45 and 46 are normally disengaged from their associated pairs of stationary contacts.

Line terminal 21 is connected to fuse terminal 30, line terminal 22 is connected to fuse terminal 32 and line terminal 23 is connected to the fuse terminal 34. Fuse terminal 31 is connected by a wire 55 to the stationary contacts 47 and 49. Fuse terminal 31 is also connected by a wire 56 to the control switch terminal 27. Fuse terminal 33 is connected by a wire 57 to stationary contact 54 and fuse terminal 35 is connected by a wire 58 to a stationary contact 52. Fuse terminal 35 is also connected by a wire 59 to solenoid terminal 40. The remaining solenoid terminal 41 is connected by a wire 60 to control switch terminal 29. Stationary contact 48 is connected to the remaining control switch terminal 28 by a wire 61.

The stationary contact 50 is connected by a wire 62 to output terminal 24, stationary contact 51 is connected by a wire 63 to output terminal 26, and stationary contact 53 is connected by a wire 64 to output terminal 25.

Control switch terminal 27 is connecter by a wire 66 and the normally open push button switch 19 to a wire 67 which is in turn connected to the control switch terminal 29. Control switch terminal 28 is connected to a wire 68 and the normally closed push button switch 20 to the wire 67.

When switch 19 is actuated, solenoid 39 becomes energized by a circuit comprising line wire 14, dual element fuse 38, wire 59, the winding of the solenoid 39, wire 60, wire 67, switch 19, wire 66, wire 56, dual element fuse 36 and line wire 12. The various armatures 43, 44, 45 and 46 move into bridging relationship with their associated pairs of stationary contacts. The holding circuit for solenoid 39 is established comprising line wire 14, dual element fuse 38, wire 59, the winding of solenoid 39, wire 60, wire 67, normally closed push button switch 20, wire 68, wire 61, contact 48, armature 43, contact 47, wire 55, dual element fuse 36 and line wire 12. Solenoid 39 will remain energized until the stop switch 20 is subsequently actuated, which interrupts the aforesaid holding circuit.

The energization of the solenoid 39 causes the motor input conductors 15, 16 and 17 to be respectively connected to the line wires 12, 13 and 14. Thus, line wire 12 is connected to input conductor 15 through dual element fuse 36, wire 55, stationary contact 49, armature 44, contact 50, wire 62 and terminal 24. Line wire 13 is connected to motor input wire 16 through dual element fuse 37, wire 57, stationary contact 54, armature 46, stationary contact 53, wire 64 and terminal 25. Similarly, line wire 14 is connected to motor input wire 17 through dual element fuse 38, wire 58, contact 52, armature 45, contact 51, wire 63 and terminal 26. Therefore, under normal conditions of operation, the motor 18 continues to be energized until the stop switch 20 is actuated, to interrupt the holding circuit for solenoid 39, as above described. When the solenoid 39 is deenergized, the various armatures 43, 45, 44 and 46 are retracted from their associated stationary contacts, disconnecting the power supply line wires 12, 13 and 14 from the motor input wires.

As above mentioned, the duel element fuses 36, 37 and 38 are designed to handle relatively light sustained overloads, for example, overloads of the order of 100%, without opening for a predetermined time period, for example, a period of between one and two hours. Thus, the fuse elements 36, 37 and 38 will not blow when passing the relatively heavy motor starting current, as would occur if ordinary fuses were employed. However, the dual element fuse devices 36, 37 and 38 include fusable portions which will instantly liquefy under the very heavy current which would be drawn by a direct short circuit, such as a condition which could cause the motor to burn out. Thus, the dual element fuses will blow safely on direct short circuits but will hold rated current continuously. Furthermore, in a typical installation the dual element fuses will open at a sustained overload, for example, an overload of 125% within a specified period, such as two hours. Furthermore, the fuse elements 36, 37 and 38 will open in a shorter period with a greater sustained overload, for example, will open within a period of approximately eight minutes at an overload of about 200%, whereas said fuses will open within a period of approximately thirty seconds with a 600% overload. The characteristics of the fuse elements 36, 37 and 38 are therefore especially suitable for motor starting requirements wherein a substantial overload current flows at the moment of starting, said overload current being of the order of between 100 and 200 percent but not approximating the type of overload caused by a direct short circuit. The dual element fuses 36, 37 and 38 will therefore carry the starting current and will hold safely during normal operating conditions of the motor 18, whereas they will provide the required overload protection both with respect to sustained relatively light overload and high-current overload caused by direct short circuits.

Three typical types of fault may cause the control device 11 to release the main solenoid 39, as follows:

(1) If the phase wire 15 connected to line wire 12 has a sustained overload sufficient to open the dual element fuse 36, the holding circuit for the winding of solenoid 39 will be opened, causing the solenoid to become deenergized and thereby disconnecting the motor input wires 15, 16 and 17 from the line wires.

(2) If the phase circuit containing the line wire 14 and the motor input wire 17 has a sustained overload sufficient to blow the dual fuse member 38, this phase will open, causing the solenoid 39 to become deenergized, so that the motor line wires 15, 16 and 17 are disconnected from the supply line wires 12, 13 and 14 in the same manner as described in connection with the opening of the dual element fuse 36.

(3) If the phase circuit connecting line wire 13 to motor input wire 16 becomes subjected to a sustained overload sufficient to cause the dual element fuse 37 to blow, this causes the current in the two remaining phases to increase sharply, for example, to values of the order of 100% over normal value, which eventually causes either or both of the dual element fuses 36 and 38 to blow, thus deenergizing the solenoid 39 and shutting down the motor 18.

FIGURES 1 to 6 illustrate a practical embodiment, according to the present invention, of the device 11 whose wiring diagram is shown in FIGURE 7. In the embodiment illustrated in FIGURES 1 to 6 the controller device 11 comprises a bottom cover plate 70 of rigid insulating material which may be rectangular in shape, as illustrated, on which is disposed a rigid intermediate connection plate 71 of identical shape, which in turn receives thereon the rigid supporting base plate 72 carrying the solenoid 39 and other associated parts of the controller, presently to be described. As shown in FIGURE 2, the intermediate supporting plate 71 carries the upstanding stationary solenoid contacts 47, 49, 48, 50, 51, 53, 52 and 54 which register with and extend through respective slots 73 provided therefor in the base plate 72. The solenoid 39, mounted on the base plate 72 is provided with the plunger assembly 42, previously described, which carries the armature elements 43, 44, 45 and 46 engageable with the aforesaid stationary contacts responsive to the energization of the solenoid, as shown, for example, in FIGURE 4. The base plate 72 is further formed with slots 75 to receive the upstanding solenoid terminal lugs 40, 41 which are located to conductively engage the lower ends of resilient solenoid winding terminal arms 76 and 77 carried on the solenoid assembly so as to connect the solenoid to the terminal lugs 40 and 41 when the top assembly mounted on the base plate 72 is superimposed on the intermediate plate 71.

The base plate 72 is likewise formed with respective apertures 79 to receive the upstanding motor terminal binding posts 24, 25 and 26 and also with apertures 80 to receive the upstanding control switch terminal binding posts 27, 28 and 29. As shown in FIGURE 2, said binding posts are rigidly secured on the intermediate plate member 71. Also secured on said intermediate plate member are the upstanding fuse clip terminals 31, 33 and 35, and the plate member 72 is suitably formed with apertures 81 adapted to receive said upstanding fuse clip terminals when the plate 72 is superimposed on the plate 71.

As shown in FIGURE 2, the various elements carried by the intermediate plate member 71 are electrically interconnected with suitable conductors printed or plated on the opposite sides of the plate member 71 to correspond with the wiring shown in FIGURE 7.

The respective plate members 70, 71 and 72 are detachably secured together by the provision of headed securing bolts 83 threadedly engaged in the underside of the supporting plate 72, the intermediate plate 71 being formed with apertures 84 and the bottom cover plate 70 being formed with keyhole-shaped apertures 85 adapted to receive the heads of the fastening bolts 83. Said heads of the fastening bolts are adapted to pass through the apertures 84 and through the circular portions of the keyhole slots 85, whereupon the bottom plate 71 may be moved longitudinally to engage the bolt heads beneath the narrow portions of the key-hole slots 85 after which the bolts 83 may be tightened to rigidly secure the superimposed plate members 72, 71 and 70 together. The plate members 72, 71 and 70 are formed at one end thereof with spaced registrable open-ended slots 86, 87 and 88 which register when the bottom plate 70 is moved into the aforesaid locking position wherein the heads of bolts 73 are located beneath the narrow portions of the slots 85, the registering end slots 86, 87 and 88 being adapted to receive common anchoring bolts for securing the assembly to a stationary support.

Secured on the support plate 72 is a first protective housing 90 forming an enclosure to cover the movable poles and stationary contacts associated with the solenoid 39. As previously mentioned, the solenoid 39 is of conventional construction and is provided with suitable spring means biasing its plunger assembly 42 rearwardly, namely, to positions wherein the contacting poles of the solenoid are retracted from their associated pairs of stationary contacts. The biasing force of cushioning springs, shown at 91 in FIGURE 5, is overcome when the solenoid is energized in the manner previously described, to cause the solenoid plunger assembly 42 to be moved forwardly so as to bring the respective armature poles thereof into bridging conductive engagement with the pairs of stationary contacts associated therewith.

Also mounted on the support plate 72 is another housing 92 containing an insulating supporting block 93 on which are mounted the respective line terminals 21, 22 and 23. The line terminals 21, 22 and 23 are formed with respective outwardly facing resilient, generally U-shaped contact channels 94 adapted to receive depending knife blade contact elements 95 carried by fuse clip members 96 secured in the rear portion of a channel-shaped removable cover member 97 of insulating material provided on the housing 92. Secured in the cover 97 and spaced from the fuse clip members 96 are cooperating fuse clip members 98 formed with depending knife blade elements 99 adapted to be conductively received in upwardly facing generally U-shaped resilient contact channels 100 provided on the upstanding fuse clip terminals 31, 33 and 35. The dual element fuses 36, 37 and 38 are mounted in the respective pairs of fuse clip members 96 and 98 so as to be connected into the circuit shown in FIGURE 7 when the cover 97 is engaged on the top of the housing 92 in the manner illustrated in FIGURES 1, 2, and 5. As shown in FIGURE 4, the contact channels 94 and 100 are located at one side of the fuse clips, namely, at the upper side. Thus, the knife blade contact elements 95 and 99 can only make conductive engagement with the contact channels 94 and 100 when the cover 97 is placed on the housing 92 in one particular position thereof. When the cover 97 is reversed in direction, namely, turned end-for-end from the position thereof shown in FIGURE 5, the contact blades 95 and 99 cannot make conductive engagement with their intended terminals, whereby the device is open circuited at the fuse clips. Thus, when the channel-shaped cover 97 is pulled out, reversed and then remounted on the housing 92, the motor controlling device 11 is rendered inoperative. The cover 97 is suitably marked with the indicia "on" at one end thereof and "off" at the other end thereof to designate the operative and inoperative positions of the cover 97. A pivoted handle 102 is provided on the cover 97 to facilitate its removal and replacement.

The knife blade elements 95 and 99 make tight frictional engagement in the contact channels 94 and 100 and cooperate with said contact channels to hold the cover 97 in closed position on the housing 92. However, the channels 94 and 100 are sufficiently yieldable to allow the cover to be pulled off the housing 92 whenever it is necessary to examine or change the dual element fuses 36, 37 and 38.

The rear wall of housing 92 is suitably notched, as shown at 103, 104 and 105 to provide clearance for the line wires 12, 13 and 14 so that said wires may be connected to the line terminals 21, 22 and 23.

As shown in FIGURES 4, 5, and 6, the solenoid plunger assembly 42 comprises a plunger shaft 107 having a cross bar member 108 provided with a pair of depending rod elements 109 which extend through longitudinal slots 110 provided in the top wall of housing 90, the vertical rod elements 109 being connected to respective longitudinally extending block members 111 to which the transversely extending conductive bridging members 43, 44 and 45, 46 are secured. The conductive bridging members extend transversely in rectangular apertures 113 provided in the block members 111 and are slidable in said apertures, being biased toward the right ends of the apertures, as viewed in FIGURE 5, by the biasing springs 91. The springs 91 bear between the bridging members and the forward end walls of the apertures, namely, the left end walls of the apertures, as viewed in FIGURE 5, so that the springs 91 cushion the bridging members as said bridging members are brought into conductive engagement with their associated stationary contact elements. The longitudinal block members 111 are provided with depending longitudinal bottom ribs 115 which are slidably received in longitudinally extending guide slots 116 provided in the base plate 72.

The circuit illustrated in FIGURE 8 represents a variation in wiring, as over the circuit above described and illustrated in FIGURE 7. The elements employed in FIGURE 8 are the same as in FIGURE 7. In the arrangement of FIGURE 8 fuse clip terminal 31 is connected by a conductor 120 to the lower solenoid stationary contact 50 and by another conductor 121 to the control switch terminal 27. Fuse clip terminal 33 is connected by a conductor 122 to the solenoid stationary contact element 52. Fuse clip terminal 35 is connected by a conductor 123 to the solenoid stationary contact element 54 and by another conductor 124 to the solenoid winding terminal 40. The remaining solenoid winding terminal 41 is connected by a first conductor 125 to control switch terminal 28 and by a second conductor 126 to the stationary solenoid contact element 48. The associated contact element 47 is connected by a conductor 127 to control switch terminal 29. Solenoid stationary contact element 49 is connected by a conductor 130 to the output terminal 24. Solenoid stationary contact element 51 is connected by a conductor 131 to the output terminal 25. Solenoid stationary contact element 53 is connected by a conductor 132 to the remaining output terminal 26. As in the circuit of FIGURE 7 the control switch terminal 29 is connected to the conductor 67. Control switch terminal 28 is connected through the normally open push button switch 19 and a conductor 133 to the conductor 67. Control switch terminal 27 is connected through the normally closed stop switch 20 and a conductor 134 to the conductor 67.

As in the system illustrated in FIGURE 7, when the push button switch 19 is closed, the solenoid 39 becomes energized and is held closed by a holding circuit. Thus, the closing of switch 19 completes an energizing circuit for solenoid 39 comprising line wire 14, dual element fuse 38, conductor 124, the winding of solenoid 39, conductor 125, conductor 133, switch 19, conductor 67, normally closed switch 20, conductor 134, conductor 121, dual element fuse 33 and line wire 12. This establishes a holding circuit for solenoid 39 from terminal 41 through conductor 126, contact 48, pole 43, contact 47, conductor 127, conductor 67, normally closed switch 20, conductor 134, conductor 121, dual element fuse 36 and line wire 12. Under normal conditions of operation the solenoid 39 will therefore not become deenergized until the "stop" switch 20 is opened.

The energization of the solenoid 39 connects line wire 12 to motor wire 15 through dual element fuse 36, conductor 121, contact 50, pole 44, contact 49, and conductor 130. Line wire 13 is connected to motor wire 16 through dual element fuse 37, conductor 122, contact 52, pole 45, contact 51 and conductor 131. Line wire 14 is connected to motor wire 17 through dual element fuse 38, conductor 123, contact 54, pole 46, contact 53, and conductor 132.

The system of FIGURE 8 responds substantially in the same manner to relatively light sustained overloads and short-circuit overloads as the system illustrated in FIGURE 7, as described previously. The dual element fuses 36, 37 and 38 will not blow in response to momentary relatively light overloads, for example, in response to heavy starting currents. However, the dual element fuses will open after a sustained period of such overloads.

The modification illustrated in FIGURE 8 may be obviously embodied in an assembly similar to that employed for the embodiment of FIGURE 7 and specifically illustrated in FIGURES 1 to 6.

The assembled motor controller unit is preferably mounted vertically, being supported on bolts or similar fasteners engaged through the downwardly facing registering notches 86, 87, 88, with the fuse housing 92 located at the top portion of the assembly. The dual element fuses can be rapidly removed for inspection by pulling the cut-out cover member 97 from the housing 92. When thus removed, the power supply lines 12, 13 and 14 are positively disconnected from the remainder of the system. As above mentioned, when the cover 97 is replaced in reversed position said power supply lines 12, 13 and 14 are likewise disconnected from the load system.

As will be readily apparent, the proper sizes of dual element fuses may be selected in accordance with the type of motor with which the controller device is to be employed. The dual element fuses are standard commercial items which are manufactured in a wide variety of current ratings and which may be readily obtained from suppliers of electrical equipment.

The motor control device eliminates the necessity of apparatus employing overload relays and heater coils, previously employed and thus provides a considerable reduction in bulk and cost, as compared with the apparatus formerly used. Furthermore, the motor controller device responds to abnormal operating conditions, such as ground faults, sustained overloads, single phasing and direct short circuits in a manner providing complete protection for the associated motor. For example, if the solenoid contacts connecting the motor input wires to the power supply line wires become welded closed or jammed in closed positions, and an overload condition or direct short circuit develops, the control device interrupts the flow of current to the motor and shuts the motor down independently of the control switch 20. This not only gives complete motor protection but eliminates hazards to persons in the adjacent area.

Although described and illustrated in connection with a three-phase load device, namely, the three-phase motor 18, a controller of the present invention may be readily adapted for use on other polyphase circuit arrangements having two or more phases, employing the same principle of design.

Assembly of the controller is greatly facilitated by the interlocking design comprising the use of the bottom cover plate 70, the intermediate plate member 71 carrying the permanently secured conductors, terminals, and solenoid contacts, and the top supporting plate 72 carrying the main portion of the solenoid 39 and the fuse housing 92. The assembly is accomplished without the necessity of performing any wiring operations or making any soldered connections, since the parts readily interlock and form an operative assembly when the locking screws 83 are tightened after being moved into the narrow slot portions of the keyhole apertures 85, as above described. It will be noted that no other fasteners are required to assemble the controller device. Since the only moving part is the plunger assembly 42 with the bridging contact bars carried thereby and the associated biasing springs 91, a minimum amount of maintenance is required to keep the controller in proper operating condition. There is relatively small risk of the contacts sticking or becoming jammed, or of deterioration caused by aging. Furthermore, the current-carrying rating of the controller device is determined substantially only by the size of dual element fuses employed so that once the required dual element fuses are installed the rating of the controller device will not change.

The conductors provided on the opposite faces of the intermediate plate member 71 may be applied in any suitable manner. Thus, the conductors may be printed or plated onto said opposite surfaces of the plate member 71 employing conventional technique, the respective terminal elements carried on the plate member being suitably soldered to the ends of the printed or plated conductors. Thereafter, the plate member may be sprayed with suitable coating material to seal the conductors against the entry of moisture. The masses of solder on the opposite faces of the plate member 71 where the printed or plated conductors are electrically connected to the terminals and the stationary solenoid contact elements, as well as the bottom legs of the upstanding prong elements comprising the solenoid stationary contact elements and the solenoid winding terminal members 40 and 41 provide slight spacings between the intermediate plate member 71 and the adjacent upper and lower plate members 72 and 70, sufficient to allow natural air flow adjacent the faces of the intermediate plate member 71, cooling the conductors and thereby greatly increasing the current-carrying capacity of the power circuitry associated with the motor controller device. At the same time, the conductors are substantially shielded against accidental contact with foreign objects and are substantially concealed.

To facilitate the replacement of the solenoid pole members, when required, the elements 109 are preferably made detachable from the cross bar 108. Thus, the plunger rod 107 is reduced at 180 to receive the cross bar, and said cross bar is retained thereon by the use of a removable U-shaped spring clip 181 engaged in an annular groove provided at the end of the reduced rod portion 180. Cross bar 108 overlies a removable top cover plate 183 provided on the housing 90. After the clip 181 is removed, the rod 107 may be pulled forwardly to disengage the reduced portion 180 from the cross arm 108. The plate 183 may then be unfastened from the top of the housing 90, allowing the cross bar 108 to be disengaged from the rod members 109, thereby providing free access to the arms 111 and to the solenoid contact poles 43, 44, 45 and 46 carried thereby. Said contact poles are readily detachable from the arms 111 and may be easily replaced.

It will be noted that the solenoid contact poles are held in their transverse positions relative to the arms 111 by the biasing effect of the biasing springs 91, and that the contact poles may be removed by merely slightly compressing the springs rearwardly and then disengaging the poles from the ends of the springs, moving said contact poles laterally out of the rectangular apertures 113 of the arms 111.

Respective guide pins 184 and 185 are provided in the end walls of the apertures 113 and the intermediate portions of the solenoid contact poles, said pins being engageable in the ends of the springs 91 so as to center said springs and to maintain the springs in proper alignment relative to the arms 111.

While certain specific embodiments of an improved motor controller have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor controller, a rigid plate-like bottom support member and a rigid plate-like top support member of substantially identical size and shape in plan, means to detachably secure said rigid members in superimposed registering relationship, a solenoid mounted on said top member and having a plunger extending parallel to and movable parallel to said top member, a plurality of pole elements secured transversely to said plunger, respective upstanding pairs of contact elements secured to said rigid bottom member, said top member being formed with apertures through which said contact elements extend, said pairs of said contact elements being located in the paths of movement of said pole elements and being located so as to be bridgingly-connected by said pole elements responsive to the energization of the solenoid, a plurality of control switch terminals mounted on said bottom member, a plurality of upstanding output terminals mounted on said bottom member, said top member being formed with apertures through which said terminals extend, a corresponding number of upstanding load-side fuse clip terminals mounted on said bottom member, said top member being formed with apertures through which said load-side fuse clip terminals extend, respective line-side fuse clip terminals mounted on said top member adjacent to and aligned with said load-side fuse clip terminals, respective fuses connected to the aligned pairs of fuse clip terminals, said line-side fuse clip terminals being provided with line-input terminal elements, a pair of upstanding solenoid terminal lugs on the bottom member, said top member being formed with apertures through which said solenoid terminal lugs extend, respective contact terminals on the solenoid engaging said solenoid terminal lugs, circuit means on said bottom member connecting said output terminals to said load-side fuse clip terminals through certain pairs of said upstanding contact elements, circuit means on said bottom member connecting a pair of said control switch terminals in series with the upstanding solenoid terminal lugs and a pair of said load-side fuse clip terminals, and circuit means on said bottom member connecting one of said pair of first-named control switch terminals in series with the solenoid terminal lugs, said last-named pair of load-side fuse clip terminals, another pair of said upstanding contact elements, and another of said control switch terminals.

2. The motor controller of claim 1, and wherein said fuses are of the dual-element type arranged to carry relatively light overload currents for sustained periods of time before blowing but arranged to blow immediately responsive to the passage therethrough of relatively heavy overload currents of the order produced by direct shorting of the output terminals.

3. The motor controller of claim 1, and wherein the fuses are carried in a detachable cover containing fuse-supporting clips provided with depending prongs conductively-engageable with the pairs of aligned line-side and load-side fuse clip terminals.

4. The motor controller of claim 3, and means to secure the cover on the top member either in an operative position wherein said last-named depending prongs conductively engage said line-side and load-side fuse clip terminals or in a reverse inoperative position wherein said last-named depending prongs are disengaged from the line-side and load-side fuse clip terminals.

References Cited
UNITED STATES PATENTS

| | | | |
|---|---|---|---|
| 980,090 | 12/1910 | Forman | 317—13 X |
| 3,064,161 | 11/1962 | Albertsson et al. | 317—13 |
| 3,178,613 | 4/1965 | Dornbush et al. | 317—14 X |

MILTON O. HIRSHFIELD, *Primary Examiner.*

J. D. TRAMMELL, *Assistant Examiner.*